US008463901B2

(12) United States Patent  
Caram

(10) Patent No.: US 8,463,901 B2  
(45) Date of Patent: Jun. 11, 2013

(54) STATEFUL FLOW INFORMATION TABLE METHOD AND SYSTEM FOR PACKET INSPECTION SYSTEM

(75) Inventor: Bruce E. Caram, Hudson, MA (US)

(73) Assignee: Arbor Networks, Inc.

( * ) Notice: Subject to any disclaimer, the term of this patent is extended or adjusted under 35 U.S.C. 154(b) by 621 days.

(21) Appl. No.: 12/790,509

(22) Filed: May 28, 2010

(65) Prior Publication Data

US 2011/0296002 A1 Dec. 1, 2011

(51) Int. Cl.
*G06F 15/16* (2006.01)
*G06F 12/00* (2006.01)

(52) U.S. Cl.
USPC .......................................... 709/224; 709/250

(58) Field of Classification Search
USPC .......................................... 709/223–229, 250
See application file for complete search history.

(56) References Cited

U.S. PATENT DOCUMENTS

| 6,157,617 | A  | * | 12/2000 | Brandin et al. | 370/252 |
| 6,628,615 | B1 | * | 9/2003  | Joseph et al.  | 370/231 |
| 7,359,354 | B2 | * | 4/2008  | Julka et al.   | 370/331 |
| 7,624,190 | B1 | * | 11/2009 | Aviani et al.  | 709/234 |
| 7,743,166 | B2 |   | 6/2010  | Dobbins et al. |         |
| 8,174,977 | B2 | * | 5/2012  | Brownell et al. | 370/231 |
| 8,255,519 | B2 | * | 8/2012  | Allen et al.   | 709/224 |
| 2008/0159135 | A1 |  | 7/2008  | Caram          |         |

* cited by examiner

*Primary Examiner* — Zarni Maung
(74) *Attorney, Agent, or Firm* — Edwards Wildman Palmer LLP; Scott D. Wofsy; Christopher J. Capelli

(57) ABSTRACT

A packet processing system comprises two packet inspection systems for tracking packet flows between a first network and a second network. A memory is accessible by each of the packet inspection systems for storing flow entries. Each of the flow entries includes a flow key characterizing a packet flow associated with flow entry, a flow identifier. State information is further maintained indicating ownership of the flow identifiers among the two packet inspection systems. Using stateful identifiers ensures that two packet processing systems do not become incoherent and properly indicate the status of free flow identifiers.

18 Claims, 5 Drawing Sheets

Flow record memory 124

| FIT number 142 | Source+Dest+Port+Protocol 144 | Flow data 146 |
|---|---|---|
| | | |
| | | |

Fig. 2

Flow information table memory 122

| FIT number 142 | FIT State 152 |
|---|---|
| | |
| | |

Fig. 3

| FIT State | Previous State | Entities Set By | Entities Changed By | Next State |
|---|---|---|---|---|
| PeerOwned | Valid | PP Threads | PP Threads | Valid |
| | OnFreeList | Peer-Stocker Local-Stocker | Local-Stocker Peer-Stocker | OnStockerRing OnFreeList |
| Valid | PeerOwned | PP Threads | PP Threads Ager | OnReturnRing PeerOwned |
| | PP-Cached | | Ager | OnReturnRing |
| OnReturnRing | Valid | PP Threads | Local-Stocker | OnStockerRing OnFreeList |
| OnStockerRing | OnFreeList PeerOwned OnReturnRing | Local-Stocker Peer-Local-Stocker Stocker | PP Threads | PP-Cached |
| PP-Cached | OnStockerRing | PP Threads | PP Threads | Valid |
| OnFreeList | OnReturnRing PeerOwned | Local-Stocker Peer-Stocker | Local-Stocker Peer-Stocker | PeerOwned |

Fig. 6

STATEFUL FLOW INFORMATION TABLE METHOD AND SYSTEM FOR PACKET INSPECTION SYSTEM

BACKGROUND OF THE INVENTION

Packet inspection systems are typically deployed at the network edges to monitor the flow of packets between a network, such as a service provider network, and a public network, such as the Internet. The systems inspect packets based on the source internet protocol (IP) address, destination IP address, ports, and protocol. Packets from source addresses that are the origin of denial of service attacks can then be dropped. Further, packets having combinations of addresses, ports, and protocols can be dropped or slowed pursuant to network security policies governing the combinations in order to ensure bandwidth is reserved for other, legitimate communications.

A newer function for packet inspection systems is Deep Packet Inspection (DPI). This involves the analysis of the payload of packets of a flow to determine the identity of the flow's associated application. Example applications include peer-2-peer networks that are sometimes used for copyright theft; packets originating from these peer-2-peer applications can dropped or slowed. Other examples include voice and video applications. These are often assigned priorities that are consistent with the policies of the network. For example, voice applications, e.g., voice over internet protocol (VOIP), are often assigned preferred transport over the network in terms of latency and possibly bandwidth since such performance is required for these types of applications.

Often these packet inspection systems must monitor the packets at very high data rates, since they are deployed on links between networks or on major links within a network. To handle these high data rates, one architecture uses a combination of two physically independent packet inspection subsystems. One of the packet inspection subsystems handles data being sent to a protected or secure network and the other packet inspection subsystem handles data being sent from the protected network to a public network, for example.

Each of these dual packet inspection subsystems monitors the state of each conversation by aggregating the information from the individual packets into flows. Flows are characterized by a flow key that is a unique combination of public or unsecure network IP address, secure network IP address, public or unsecure network TCP/UDP port, secure network TCP/UDP port and protocol.

It is important that the packet inspection subsystems be synchronized to the extent that they operate in a coherent fashion on the same flows. As new flows are detected by each of the packet inspection subsystems, entries or records are created in a flow information table. A unique flow identifier is then assigned to that new flow. In one example, when a new flow is created by one of the packet inspection subsystems, that packet inspection subsystem sends a flow-create message to the other packet inspection system. This message contains the unique flow information table identifier or number and a flow key that uniquely characterizes the flow, such as a combination of the flow's public network IP address, secure network IP address, public network TCP/UDP port, secure network TCP/UDP port, and protocol.

The two packet inspection subsystems are designed to operate in a coherent fashion such that the same flows are indentified by the same flow information table identifiers. Nevertheless, under certain circumstances, conflicts sometimes arise. One common conflict occurs when both of the packet inspection subsystems seek to create a new flow record for the same flow at effectively the same time. As a result, they both assign new flow information table identifiers to that flow and then signal the other packet inspection subsystem to create a new entry in flow record memory. The problem is that the same flow will now have two different flow information table identifiers.

In one example, the conflict is arbitrated by designating one of the packet inspection subsystems as a master (secure) and the other as a slave (unsecure). It is the slave packet inspection subsystem's responsibility to recognize the conflict and then to reassign and then store flow information to the entry with the flow information table identifier dictated by the master packet inspection subsystem.

SUMMARY OF THE INVENTION

Even when using this master and slave arrangement, it is still possible that two packet inspection subsystems become incoherent with respect to each other. One such situation occurs when flows are created and deleted in quick succession. The master packet inspection subsystem may signal the slave concerning the creation of a new flow and then signal that this flow should then be deleted while the slave packet inspection subsystem is signaling the master to create a record for the same flow. In such situations, the flow information table identifiers can be treated inconstantly by the subsystems such that the same identifier becomes assigned to two different flows. This can cause the systems to behave in unpredictable fashion, especially when one subsystem believes flow information identifier is free but the other subsystem believes that the same identifier is assigned to a flow.

In order to ensure that flow information table identifiers are handled in coherent and orderly fashion between the two packet inspection subsystems the flow information tables in the flow information table memories include state information in association with each of the flow information table identifiers. This state dictates the notional ownership and/or location of the flow information table identifiers. Through the use of these states, a deterministic Finite State Automata is created that ensures valid state transitions as the flow information table identifiers are handled by the subsystems and the various processed or thread executing on the subsystems tracking the state of the flow information table identifiers.

In general, according to one aspect, the invention features a packet processing system. The system comprises two packet inspection systems for tracking packet flows between a first network and a second network. A memory is accessible by each of the packet inspection systems for storing flow entries. Each of the flow entries includes a flow key characterizing a packet flow associated with the flow entry, a flow identifier. State information is further maintained indicating ownership of the flow entry among the two packet inspection systems.

In general, according to another aspect, the invention features a method. This method comprises tracking packet flows between a first network and a second network with two packet inspection systems and maintaining flow entries for each of the packet flows, in which each of the flow entries includes a flow key characterizing a packet flow associated with flow entry, and a flow identifier. State information is further maintained indicating ownership of the flow entry among the two packet inspection systems.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 2 is a block diagram showing the organization of the flow record memory for each of the packet inspection subsystems;

FIG. 3 is a block diagram showing the organization of the flow information table memory;

FIG. 6 is a state diagram showing the possible states of each flow information table entry.

DETAILED DESCRIPTION OF THE PREFERRED EMBODIMENTS

Figure 1:
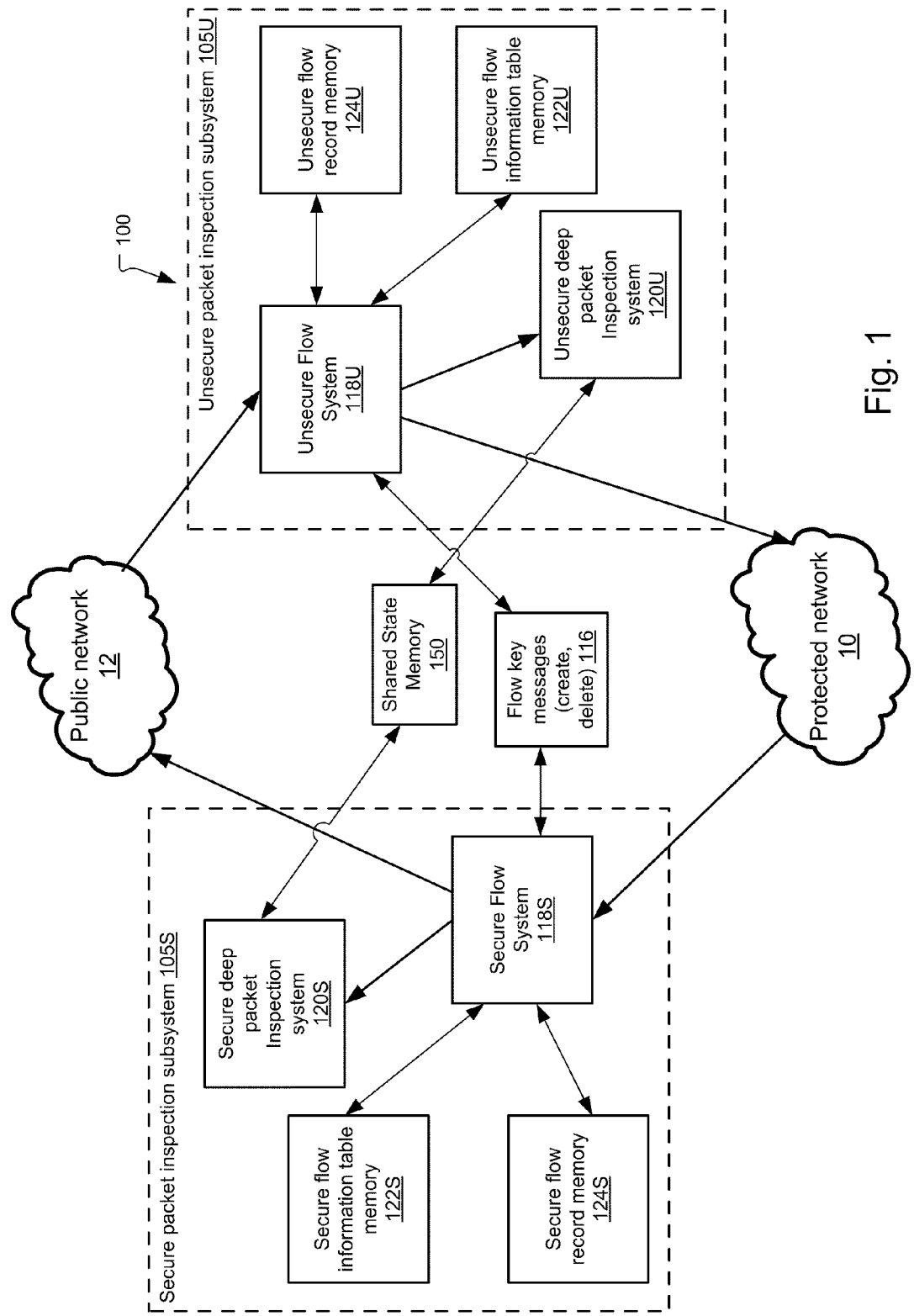
FIG. 1 is a block diagram showing a packet processing system with two packet inspection subsystems.

FIG. 1 shows a packet processing system 100 to which the present invention is applicable.

In the illustrated example, the packet processing system 100 sits at the boundary between a public or unsecure network 12 and a protected or secure network 10. An example of a public network 12 is the Internet. The protected network 10 is the network of an enterprise, such as a company in one implementation. In other examples, the protected network 10 is the network of a service provider that supplies network connectivity to many enterprises and/or individual subscribers, such as residential subscribers. In still other examples, the packet processing system 100 is deployed at a link in a service provider or enterprise between two parts of the provider's or enterprise's network.

Generally, the packet processing system 100 comprises a secure packet inspection subsystem 105S and an unsecure packet inspection subsystem 105U. These deep packet inspection subsystems 105S, 105U communicate via flow key messages 116 and a shared state memory 150. Generally, the secure packet inspection subsystem 105S handles packets sent from the protected network 10 to the public network 12. On the other hand, the unsecure packet inspection subsystem 105U handles packets sent from the public network 12 to the protected network 10.

A secure flow system 118S of the secure packet inspection subsystem 105S and an unsecure flow system 118U of the unsecure packet inspection subsystem 105S are used to monitor packets and assign those packets to particular flows between entities in the public network 12 and other entities in the protected network 10. Each of the flow systems 118S, 118U creates the flows and tracks usage statistics for each of the flows in the corresponding secure and unsecure flow record memories 124S, 124U. The flow systems 118S, 118U also apply quotas and rate limits to the flows. They also assign flow identification numbers to the flows and create flow keys.

For each monitored flow, the measured usage (packet count) and other statistics are stored along with any rate limits to be applied to that flow.

Generally, the flow systems 118S, 118U track and differentiate packets and the flows based on packet header information including the flow's public or unsecure network IP address, secure network IP address, public network TCP/UDP port, secure network TCP/UDP port, and protocol.

To glean the underlying applications that are generating the flows, it is necessary many times to analyze the payload of packets in the flows. For example, many peer-2-pear network applications will operation on generic HTTP ports, e.g., port 80. To perform packet payload inspection, a secure deep packet inspection system 120S is provided to analyze the network traffic from the protected network 10 to the public network 12 and an unsecure deep packet inspection system 120U is provided to monitor the network traffic generated within the public network 12 and destined for the protected network 10.

The deep packet inspection systems 120S, 120U generally cannot operate on line speeds. Thus, only a portion of the packets processed by the flow systems 118S, 118U are tagged for analysis by the deep packet inspection systems 120S, 120U.

The deep packet inspection systems 120S, 120U receive the flow keys and flow information table identification numbers generated by the flow systems 118S, 118U. Generally, the deep packet inspection systems 120S, 120U use the shared state memory 150 for Deep Packet Inspection (DPI) and heuristic analysis state information of the flows. The deep packet inspection systems 120S, 120U analyze packet payloads to enable the identification of the particular categories of applications that sent the packets such as peer-2-peer (P2P) and VOIP applications. This information is used to characterize the flows beyond the IP address, port and protocol information that is gleaned from the packet headers.

The state memory 150 is accessible by both of the deep packet inspection systems 120S, 120U. The state memory allows the deep packet inspection systems 120S, 120U to coordinate their analysis to better categorize and classify the monitored flows.

Each of the secure flow system 118S and the unsecure flow system 118U also has a flow record memory 124S, 124U. These memories store the flow records maintained by each of the packet inspection subsystems 105S, 105U. The flow record memories store the flow keys generated from the flows' public network IP address, secure network IP address, public network TCP/UDP port, secure network TCP/UDP port, and protocol and the flow information table identifiers that are assigned to each of the flows.

FIG. 2 illustrates the construction of the flow record memories 124 maintained by both of the flow systems 118S, 118U.

Entries in the flow record memories 124 are organized as a hash table, based on a hash of the flow key. The entries also contain the corresponding flow key 144 along with the flow data 146 corresponding to the flow as well as associated flow information table identifier (FIT number) 142. The flow data field 146 stores the information generated by the packet inspection systems 105S, 105U from the monitoring of the flow. Typically, the flow data includes information on the packet payloads contained in the packets of the flow, whether the flows are encrypted, TCP flags, and packet counts. It also contains pointers to rate limits and other actions that are to be applied to the flows.

FIG. 3 illustrates the construction of the flow information table memories 122 maintained by both of the flow systems 118S, 118U.

Entries in this table are indexed by the FIT number 142 and each contains the state of the FIT number: the FIT state 152. This is a variable that identifies the state of the flow information entry. In general, the FIT state 152 indicates the ownership of the entry among the packet inspection subsystems 105S, 105U and also the state of the entry such as whether it is cached by one of the packet inspection subsystems 105S, 105U.

Figure 4:
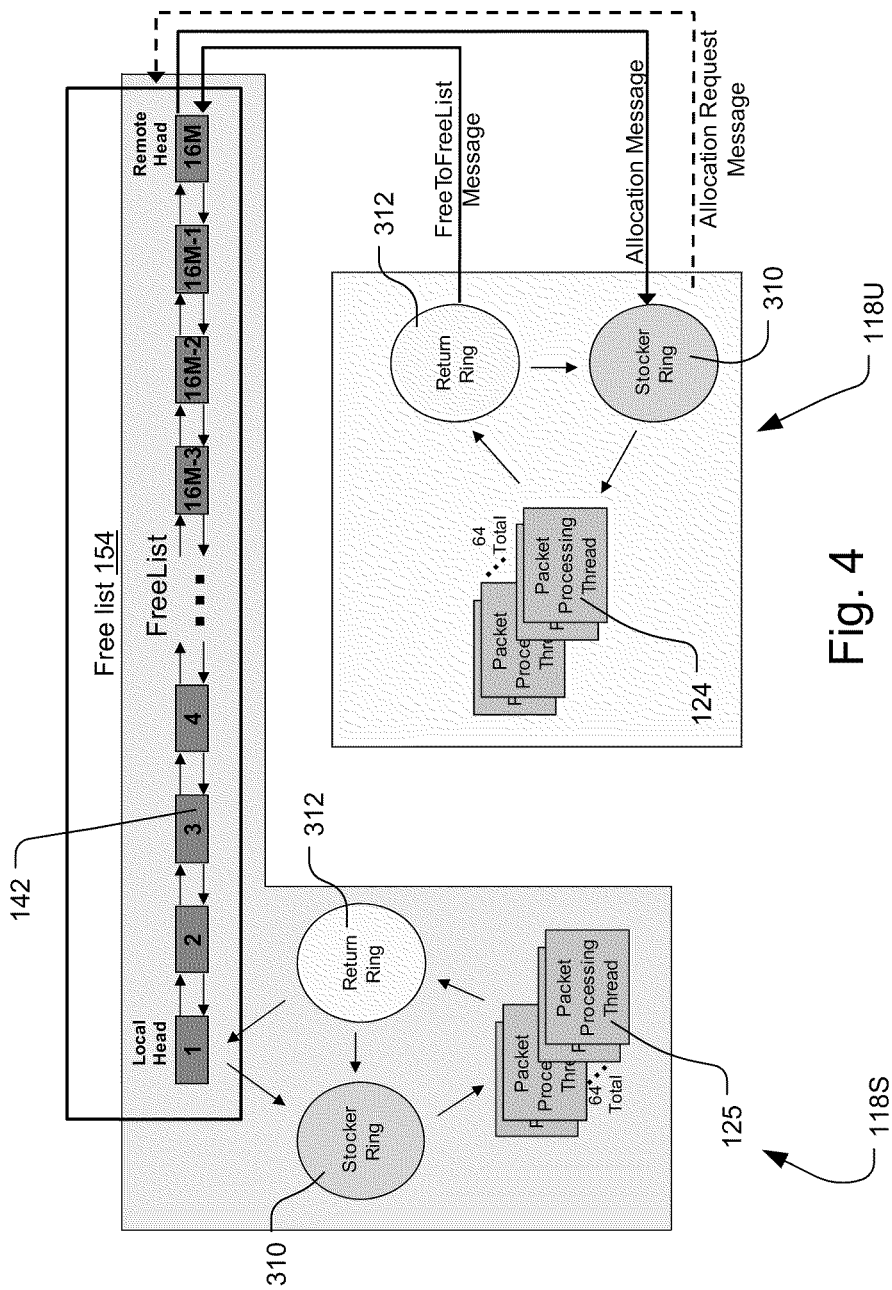
FIG. 4 is a block diagram showing the processes running on flow systems.

FIG. 4 illustrates the processing threads that are executed by the flow systems 118S, 118U to process the packets and allocate FIT numbers to the flows.

In more detail, a free list 154 is maintained by the secure flow system 118S functioning as the master. In one example, the free list 154 contains flow identifiers (FIT numbers) 142, in an ordered linked list, that are currently not assigned to any active flow. In one implementation, the flow identifiers 142 are numbered between one and 16 million and the freelist is characterized by a local head that starts with FIT number (1) or the lowest valued free FIT number. The remote head of the freelist 154 starts with FIT number (16 million) or the highest valued free FIT number.

Multiple packet processing threads 125 execute in parallel to analyze each of the packets that are received by the corresponding flow system 118. When a new packet is received, it is assigned to a packet processing thread 125, which then takes appropriate action such as determining whether the new packet is part of an existing flow in flow record memory 124S,124U, creating a new packet flow if required, and updating the information associated with that packet flow if an associated flow is present in the flow record memory 124 such as by incrementing a packet count. On the other hand, when a packet is received that is not part of an existing flow, the assigned packet processing thread designates a free FIT number and creates a flow in flow record memory 124.

Figure 5:
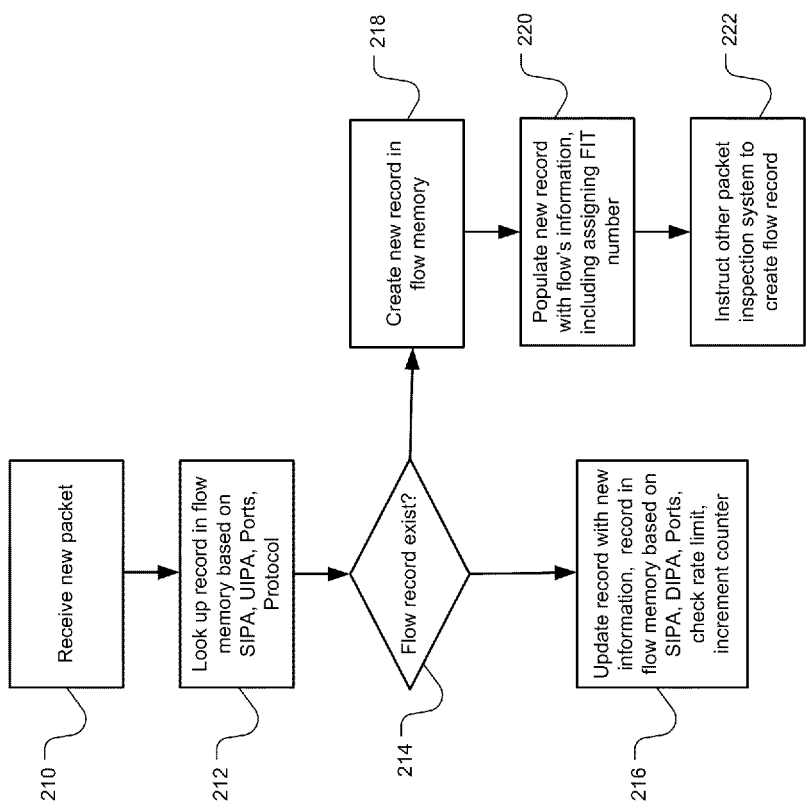
FIG. 5 is a flow diagram illustrating the process for the creation of a new flow by the packet inspection subsystems.

FIG. 5 illustrated the packet processing performed by the packet processing threads 125 of each of the flow systems 118S, 118U upon receipt of a new packet.

In more detail, in step 210, a new packet is received. In step 212, the receiving packet processing thread 125 derives the flow key for the packet. This is calculated from the packet's public network IP address, secure network IP address, public network TCP/UDP port, secure network TCP/UDP port, and protocol. The packet processing thread 125 then looks for a matching flow key in its flow record memory 124S,124U via a hashing of the flow key. In step 214, it determines whether a matching record exists.

If a record exists, then in step 216, the record is updated with the information from the new packet. Typically, the rate limit for the flow is checked, and the counter associated with the number of bytes in the flow is incremented in the corresponding record in the flow record memory 124. If required, the packet, in some examples, is then further passed to the associated deep packet inspection systems 120 for signature detection and/or content inspection for further analysis to determine whether the packet complies with or violates established network security policies.

On the other hand, if there is no matching flow record as determined in step 214, then packet processing thread 125 of the flow system 118 allocates a FIT from the flow information table Stocker Ring and creates a flow that is stored in the flow record memory 124 in step 218. In step 220, the new record is populated with the statistics associated with this flow. By default, all new flows are classified according to their well known port number (e.g. TCP port 80=HTTP). This classification is updated by the packet processing threads 125 based on the results of the deep packet inspection systems 120 processing of the flow. The flow key field 144 updated with the calculated flow key. A new flow identifier or FIT number is assigned to the flow and entered into the FIT number field 142. Finally, according to the invention a FIT state for the corresponding FIT number is updated in the flow information table memory 122.

Finally, in step 222, the packet inspection system 105 sends a message to its peer packet inspection system to create a flow record for this newly detected flow based on the combination of the flow key and FIT number.

Returning to FIG. 4, flow systems 118 pull new FIT numbers 142 for new flows from a common pool, or freelist 154. The freelist 154 contains FIT numbers that are currently not assigned to the FIT number for any active flow, and the freelist 154 is maintained by the secure flow system 118S. The single freelist 154 for both flow systems 118S, 118U is required because each flow must be assigned a unique FIT number regardless of which flow system 118S, 118U creates the flow table entry.

Packet processing threads 125, in one implementation, acquire and free new FIT numbers using two caches, a stocker ring 310 and a return ring 312. These caches are maintained by each of the flow systems 118S, 118U as separate processing threads.

The stocker ring 310 and the return ring 312 respectively pull/push FIT numbers from/to different ends of the freelist 154 depending on the flows system on which they are executing. In the illustrated embodiment, the stocker ring 310 and a return ring 312 of the secure flow system 118S pull/push free FIT numbers from/to the local head of the freelist 154, and the stocker ring 310 and a return ring 312 of the unsecure flow system 118U pull/push free FIT numbers from/to the remote head of the freelist 154.

Each stocker thread 310 maintains the associated stocker ring for the corresponding flow system 118. The stocker thread 310 insurers that the stocker ring contains a block of free FIT numbers. As each of the packet processing threads requires new FIT numbers, the packet processing threads 125 acquire the new FIT numbers from the stocker ring 310.

The stocker 310 on the secure and unsecure flow systems 118S, 118U behave somewhat differently, however. The secure flow system 118S has direct access to the freelist 154. The unsecure flow system 118U needs to send messages when it needs another block of free FIT numbers, or when the limits of the stocker and/or return ring caches 310, 312 have been met, and excess FIT number need to be put back on the freelist 154.

Somewhat similarly, return ring threads 312 for each of the flow systems 118S, 118U maintain return ring caches that receive discarded FIT numbers. Typically FIT numbers are discarded when the flow has been terminated, such as receipt of a TCP FIN or RST packet, or the flow has been removed from the flow memory by operation of an ager thread when no new packet have been detected for the flow for a predetermined time period. These discarded FIT numbers are held on the return rings 312. From the return ring, the free FIT numbers are either returned to the freelist 154 or given to the stocker ring 310.

Using a combination of the stocker ring 310 and the return ring 312 for each of the flow systems 118S, 118U, free flow identifiers are cached locally in each of the flow systems 118S, 118U so that they can be quickly distributed as required by the packet processing threads 125.

In order to ensure that FIT numbers are handled in coherent and orderly fashion between the two packet inspection subsystems 105S, 105U, the flow information tables in the flow information table memories 122 include state information 152 in association with each of the FIT numbers. This state dictates the notional ownership and/or location of the FIT number. Through the use of these states, a deterministic Finite State Automata is created that ensures valid FIT state transitions as the FIT number move between the FreeList 154, return rings 312, stocker rings 310, and in a valid state. i.e., assigned to a monitored flow. The state transitions are executed by the processing threads, i.e., stocker ring threads 310, return ring threads 312, packet processing threads 125, and ager threads, executing on the flow systems 118.

Tracking the state of the FIT numbers prevents corruption of the free list 154. Corruption is defined as a FIT number being simultaneously used to identify a flow and also being found on the free list 154. Such a situation can result in flows with the same key and different FIT number and flows with different keys but the same FIT number, and premature FIT exhaustion, since the free list is corrupted.

FIG. 6 illustrates the possible current states of a FIT number, along with previous states, which entity can set and change the states, and the next state based on the current FIT state for the flow identifiers.

In more detail, there are six potential FIT states associated with each of the FIT numbers in the flow information tables 122 of each of the packet inspection subsystems 105S, 105U: 1) owned by the other packet inspection subsystem for assignment to new flows it may create, PeerOwned; 2) assigned to an active flow, Valid; 3) on the local return ring 312, OnReturnRing; 4) on the local stocker ring 310, OnStockerRing; 5) cached by a local packet processing thread, PP-cached; or 6) on the freelist 154, OnFreeList.

It should be noted that the FIT states are not the same for the same FIT number across the two flow information tables 122S, 122U that are maintained in the two memories. For example if a FIT number is on a return ring 312 in the secure flow system 118S, then the flow information table in the memory 122S will indicate its state as: OnReturnRing. In contrast, the flow information table in the memory 122U will indicate that the state of that same FIT number as PeerOwned. In a similar vein, OnFreeList state is only an applicable state on the secure side since the secure flow system 118S maintains the free list 154. Further on boot-up, all FIT states are set to OnFreeList by the secure packet inspection subsystem 120S and PeerOwned by the unsecure packet inspection subsystem 120U.

In more detail, for FIT numbers with a state of PeerOwned, the previous state was either Valid or OnFreeList. If the previous FIT state was valid, it was set to PeerOwned by packet processing threads, which may also set the state Valid. If the previous state was OnFreeList, it was set to PeerOwned by the Peer/Local Stocker threads. The local stocker may change the state from PeerOwned to OnStockerRing, whereas the Peer-Stocker may change the state from PeerOwned to OnFreeList.

For FIT numbers with a state of Valid, the previous state was either PeerOwned or cached by a packet processing thread 125. The next valid state is either OnReturnRing, PeerOwned, or OnReturnRing. This state can be set by the packet processing threads 125. The state can be changed by the packet processing thread 125 or an ager thread, but only the Ager may set the state to PeerOwned.

For FIT numbers with a state of OnReturnRing, the previous state was only valid. The next valid state is either OnStockerRing or OnFreeList. This state can be set by the packet processing threads 125. The state can be changed by the local stocker ring thread 310.

For FIT numbers with a state of OnStockerRing, the previous state was OnFreeList, PeerOwned, or OnReturnRing. The next valid state is only cached by a packet processing thread 125. This state can be set by the local or peer stocker ring threads 310. The state can be changed by the packet processing threads 125.

For FIT numbers with a state of PP-Cached, the previous state was OnStockerRing. The next valid state is only Valid. This state can be set by the owned by packet processing threads 125. The state can be changed by the packet processing threads 124.

For FIT numbers with a state of OnFreeList, the previous state was OnReturnRing or PeerOwned. The next valid state is only PeerOwned. This state can be set by the local or peer stocker ring threads 310. The state can be changed by local or peer stocker ring threads 310.

While this invention has been particularly shown and described with references to preferred embodiments thereof, it will be understood by those skilled in the art that various changes in form and details may be made therein without departing from the scope of the invention encompassed by the appended claims.

What is claimed is:

1. A packet processing system, comprising:
   packet inspection subsystems for tracking packet flows between a first network and a second network;
   a flow record memory for storing flow entries, each of the flow entries including a flow key characterizing a packet flow associated with flow entry and a flow identifier
   a flow information table memory that stores state information indicating ownership of the flow identifier among the packet inspection subsystems.

2. A system as claimed in claim 1, wherein one of the packet inspection subsystems inspects packets from a protected network and another one of packet inspection subsystems inspects packets from a public network.

3. A system as claimed in claim 1, wherein each of the packet inspection subsystems inspects the payload of packets in the packet flows and handles packet flows based on the inspection of the payloads.

4. A system as claimed in claim 1, wherein each of the packet inspection subsystems inspects the headers of packets in the packet flows and handles packet flows based on the inspection of the headers.

5. A system as claimed in claim 1, wherein each of the flow keys is generated based on a source internet protocol (IP) address, destination IP address, and port.

6. A system as claimed in claim 1, wherein one of the packet inspection subsystems maintains a free list containing flow identifiers that are not assigned to any of the flow entries.

7. A system as claimed in claim 6, wherein the state information further indicates a presence of the flow identifier in the free list.

8. A system as claimed in claim 6, wherein the packet inspection systems maintain a stocker cache of flow identifiers retrieved from the free list, the state information further indicating presence of the flow identifiers in the stocker cache.

9. A system as claimed in claim 6, wherein the packet inspection systems maintain a return cache of flow identifiers to be returned to the free list, the state information further indicating presence of the flow identifiers in the return cache.

10. A packet processing method, comprising:
    tracking packet flows between a first network and a second network with two packet inspection subsystems; and
    maintaining flow entries for each of the packet flows, each of the flow entries including a flow key characterizing a packet flow associated with the flow entry, and a flow identifier; and maintaining state information indicating ownership of the flow identifiers among the two packet inspection subsystems.

11. A method as claimed in claim 10, further comprising inspecting packets from a protected network and from a public network.

12. A method as claimed in claim 10, further comprising inspecting payloads of packets in the packet flows and blocking packet flows based on the inspection of the payloads.

13. A method as claimed in claim 10, further comprising inspecting headers of packets in the packet flows and blocking packet flows based on the inspection of the headers.

14. A method as claimed in claim 10, further comprising generating the flow keys based on a source internet protocol (IP) address, destination IP address, and port.

15. A method as claimed in claim 10, further comprising one of the packet inspection systems maintaining a free list containing flow identifiers that are not assigned to any of the flow entries.

16. A method as claimed in claim 15, wherein the state information further indicates a presence of the flow identifier in the free list.

17. A method as claimed in claim 15, further comprising the packet inspection subsystems maintaining a stocker cache of flow identifiers retrieved from the free list, the state information further indicating presence of the flow identifiers in the stocker cache.

18. A method as claimed in claim 15, further comprising the packet inspection systems maintaining a return cache of flow identifiers to be returned to the free list, the state information further indicating presence of the flow identifiers in the return cache.

* * * * *